March 12, 1957
R. M. BARR ET AL
2,784,735
WATER FEED CONTROLS FOR HOT AIR FURNACE HUMIDIFIERS
Filed May 13, 1954
2 Sheets-Sheet 1
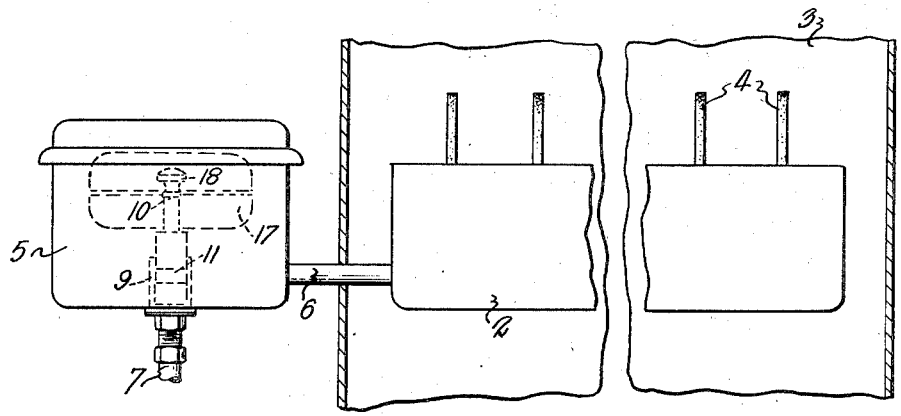
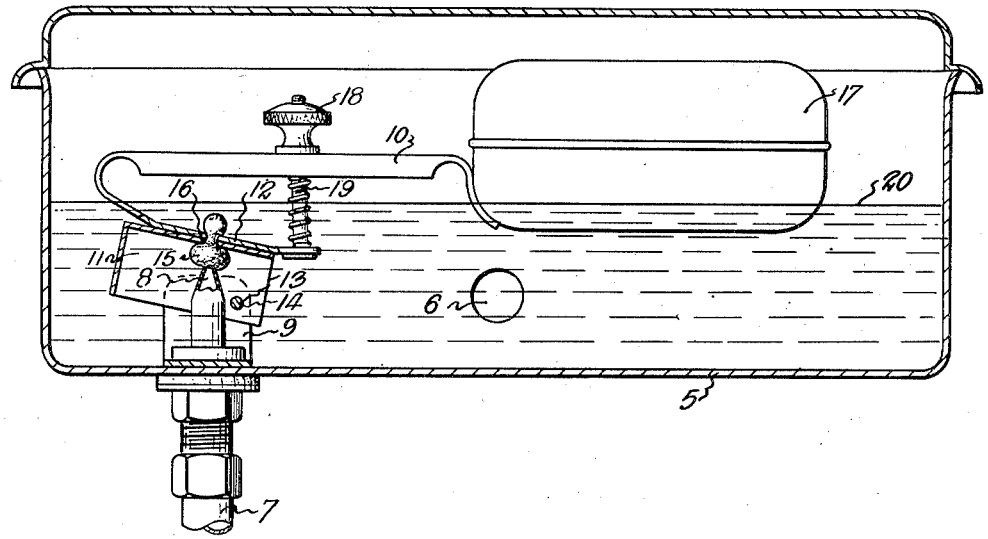
— Inventors —
Robert M. Barr.
Harry J. Scott
by *Stonebaugh & Co*
Attys.

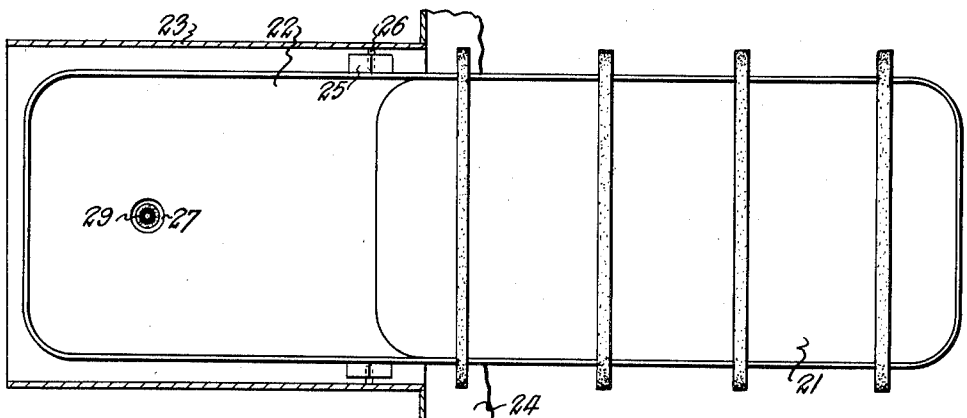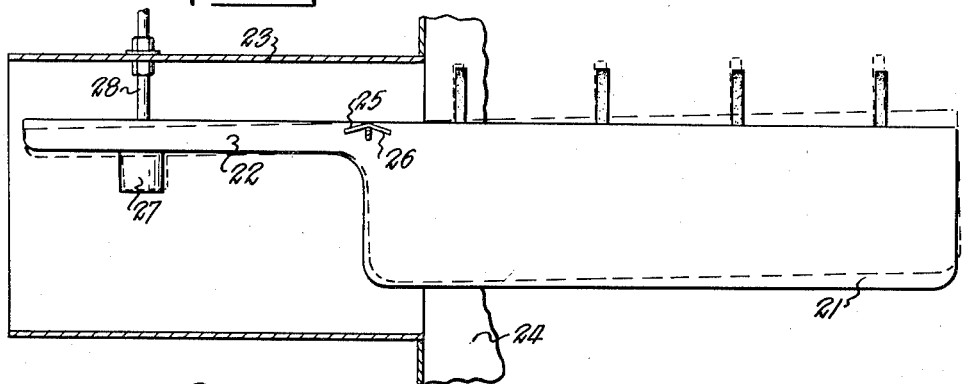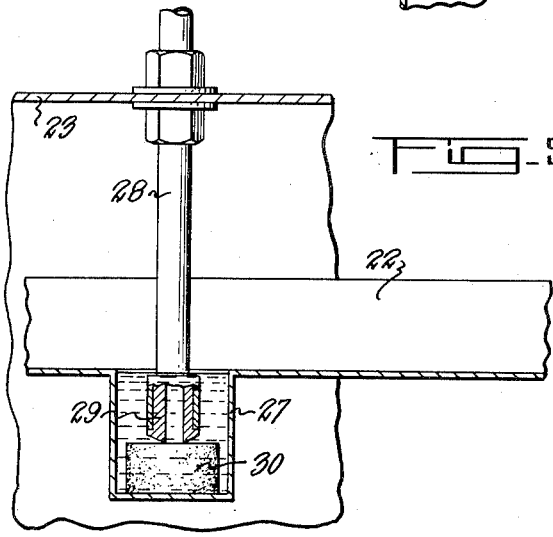

United States Patent Office 2,784,735
Patented Mar. 12, 1957

2,784,735

WATER FEED CONTROLS FOR HOT AIR FURNACE HUMIDIFIERS

Robert M. Barr and Harry J. Scott, Hamilton, Ontario, Canada

Application May 13, 1954, Serial No. 434,046

1 Claim. (Cl. 137—426)

Our invention relates to improvements in water feed controls for hot air furnace humidifiers of the type wherein the water vaporizing pan is contained within the furnace hot air duct and in which the water is maintained at a predetermined level within the pan by an automatically actuated valve controlling passage of water thereinto; and the object of the invention is to so arrange the control valve assembly that it is always immersed within the feed water, whereby the deposition of lime or other impurities from the water vaporizing in the reservoir or the accumulation of other foreign matter upon the valve and seat is prevented.

Two types of hot air furnace humidifiers are in general use; one type consisting of a vaporizing pan contained within the hot air duct of the furnace and having an exterior water reservoir, the water level in the pan and the reservoir being controlled by a float valve contained within the reservoir; the other type of humidifier consisting of a rockably mounted water vaporizing pan wherein the gradually changing weight of the vaporizing water in the pan controls the water feed valve operable in response to the head of water supplied to the humidifier and the weight of water contained within the humidifier pan.

In our invention we so arranged the first type of humidifier that the water supply control valve is mounted within the reservoir below the water level and in the other type of humidifier provide a small water containing well within which the water inlet valve is always immersed.

With the foregoing and other objects in view, as shall appear, our invention consists of a water feed control for hot air furnace humidifiers, all as hereinafter more particularly described, and illustrated in the accompanying drawings; in which:

Figure 1 is a side elevational view of a float valve controlled type of humidifier, the water vaporizing pan being contained within a furnace hot air duct, shown broken away in section.

Figure 2 is an enlarged vertical cross-sectional view through the water reservoir and showing the float valve contained therein underneath the water level.

Figure 3 is a plan view of the rocker pan type of humidifier, the vaporizing pan being contained within the furnace hot air duct, which is shown broken away in section.

Figure 4 is a side elevational view of the pan, and

Figure 5 is an enlarged sectional view showing the water inlet control valve contained within the water well in the shallow end of the vaporizing pan.

The humidifier assembly shown in Figures 1 and 2 comprises a water vaporizing pan 2 designed to be mounted within a furnace hot air duct 3 and carrying the usual evaporating plates 4 which rest on the upper edge of the pan and depend downwardly into the water contained therein. The pan is fed from a water reservoir 5 positioned exteriorly of the air duct at substantially the same level as the pan.

A water supply pipe 6 extends between the water reservoir 5 and the vaporizing pan 2, and the water level in the reservoir and pan is maintained by a float valve arrangement contained within the reservoir and controlling the passage of feed water thereinto through a water feed pipe 7, which is connected to the water supply system of the building heated by the furnace.

The water inlet nozzle 8 of the water feed pipe projects upwardly from the bottom of the reservoir 5, and is straddled by a vertical U-shaped member 9 which swingably supports a float carrying arm 10 of the valve. The inner end of the float arm 10 is of U-shape form and carries an open bottom valve disc housing 11 being mounted between the legs of the U-shaped member 9 and swingably carried upon a pin 13 extending between the legs through orifices 14 in the sides of the housing 11.

To control the inlet of water through the nozzle 8 of the water feed pipe, a rubber valve disc 15 is carried by the housing 11 and positioned to rest upon the face of the water feed pipe nozzle 8 to constitute the water control valve. The valve disc is of inverted mushroom form and is carried within an orifice 16 in the housing 11 and attached leg 12.

A float 17 is mounted upon the free end of the float arm 10 and adjustment of the float height and water level is obtained by adjusting the nut 18 on the screw 19 which extends between the end of the leg 12 and arm 10. The arm and its leg are urged apart by a spiral spring carried upon screw 19.

As the pin 13 is located at one side of the nozzle 8 of the water feed pipe, swinging movement of the float arm 10 and its housing 11 carrying the valve disc 15 moves the valve disc into and out of contact with the inlet end of the nozzle 8, whereby a predetermined water level 20 in the reservoir is maintained through the float resting upon the surface of the water.

Upon reference to Figure 2 it will be seen that our float valve assembly is so arranged that the valve is normally positioned below the water level 20 in the reservoir; the purpose of which arrangement wherein the valve is submerged, being to prevent the deposition of lime or other water impurities upon the valve, which always occurs in arrangements where the valve is positioned above the water level and exposed to water vapor in the reservoir; it being appreciated that the water in the reservoir approaches generally a vaporizing temperature due to its proximity to the furnace.

By our arrangement wherein the float valve is submerged, the water acts as a lubricant and thus ensures an easy motion of the float arm about the pin 13, as well as constituting a shield against deposit of foreign matter upon the face of the valve disc 15 and the end of the water inlet nozzle 8.

The humidifier shown in Figures 3 to 5 broadly comprises a water evaporation pan 21, having a shallow extension 22 at one end thereof. A frame 23 extends from the hot air duct 24 of a furnace and is arranged to contain and support the evaporation pan unit, the unit having a pair of trunnion-like supports 25, which project from its sides to rest upon pins 26 mounted inwardly upon the sides of the frame 23, whereby the evaporation unit is rockably mounted as disclosed in Figure 4.

The shallow pan end 22 of the unit is formed with a well 27 in its bottom and within which the water feed valve arrangement is contained. A water feed pipe 28 extends downwardly through the frame 23 and carries a nozzle 29 upon its lower end, the water being fed to the evaporation unit through the pipe and nozzle. A rubber-like stopper 30 rests within the bottom of the well and consitutes the valve seat, controlling the entrance of water through the nozzle 29.

This type of humidifier operates under the differential between the gradually reducing weight of the vaporizing water in the pan, and the rocking response of the pan under the head of water supplied through the pipe 28. As the water in the evaporation pan 21 vaporizes, the weight of the water in the pan decreases until a point is reached wherein the pressure of water in the pipe 28 is sufficient to rock the pan from the position shown in full lines to the position shown in dotted lines in Figure 4, whereby water enters through the nozzle 29 past the face of the seat 30 to enter the unit. As the weight of water in the pan 21 increases the unit moves back to the position shown in full lines against the water head whereby the pressure of the seat 30 against the face of the nozzle is sufficient to cut off the flow of water entering the pan.

As will be clearly apparent upon reference to Figure 5, our well 27 is provided for the purpose of having the nozzle 29 and seat 30 immersed within the water in the well irrespective of the level of the water within the vaporizing unit. As will be seen upon reference to Figure 4, the tilting movement of the unit to admit water is so slight that there is little or no change in the water level in the well that would expose the bottom of the nozzle 29 or the seat 30 to the atmosphere.

By our invention wherein we arrange the water feed control valve assemblies so that they are always submerged in water, we have, in a very simple and practical manner, overcome the difficulties that have been heretofore encountered in hot air water vaporizing units, wherein the water flow valves are exposed to the air.

The position of the humidifying units is necessarily such that the water feed control valves are situated close to the furnace hot air duct and therefore are retained at a higher than normal temperature whereby they have a much greater tendency to collect a deposition of lime or other impurities from the water passing therethrough. In those cases where the water feed control valves are exposed to the air and the water vapor from the humidifier, it is necessary to remove the valve assemblies at least once a season and scrape off the deposits, otherwise the valves cease to operate and jam in either the closed or open position. By our invention we have overcome the difficulties by submerging the water inlet control valves, the water also acting as a lubricant, to ensure the easy motion of any moving assembly such as the float valve arrangement shown in Figures 1 and 2.

What we claim as our invention is:

A water feed control for hot air furnace humidifiers comprising a water vaporizing pan adapted to be contained within a furnace hot air duct, a water reservoir adapted to be positioned exteriorly of the hot air duct and communicating with the pan, a water feed pipe opening into the reservoir underneath the water therein, a valve controlled by a water float and contained within the reservoir to govern the entrance of water thereinto through the feed pipe, the float of the valve being so arranged in relation to the valve assembly that the valve assembly is always submerged in the water in the reservoir, the valve being in the form of a vertical U-shaped member straddling the end of the water feed pipe within the reservoir and between the legs of which a float carrying arm is pivotally mounted, a valve disc formed of rubber-like material and mounted upon the arm to engage the end of the feed pipe, the inner end of the float arm being U-shaped form with one leg pivotally mounted upon the vertical U-shaped member, and a float height adjusting screw extending between the legs of the U-shaped portion of the float arm, and a spring urging the legs of the float arm apart against the tension of the screw.

References Cited in the file of this patent
UNITED STATES PATENTS

| | | |
|---|---|---|
| 1,151,125 | Riley | Aug. 24, 1915 |
| 1,832,243 | Ritchie | Nov. 17, 1931 |
| 1,898,389 | Pendleton | Feb. 21, 1933 |
| 2,292,407 | Skerritt | Aug. 11, 1942 |
| 2,501,727 | Kubista | Mar. 28, 1950 |
| 2,509,375 | Tolley | May 30, 1950 |
| 2,588,567 | Perlman | Mar. 11, 1952 |
| 2,654,362 | Scharf | Oct. 6, 1953 |